(12) United States Patent
Takahashi et al.

(10) Patent No.: US 11,498,402 B2
(45) Date of Patent: Nov. 15, 2022

(54) SUNROOF UNIT

(71) Applicant: Yachiyo Industry Co., Ltd., Sayama (JP)

(72) Inventors: Yuya Takahashi, Tochigi (JP); Keiichiro Nakamura, Tochigi (JP)

(73) Assignee: YACHIYO INDUSTRY CO., LTD., Sayama (JP)

( * ) Notice: Subject to any disclaimer, the term of this patent is extended or adjusted under 35 U.S.C. 154(b) by 0 days.

(21) Appl. No.: 17/637,955

(22) PCT Filed: Jun. 25, 2020

(86) PCT No.: PCT/JP2020/024984
§ 371 (c)(1),
(2) Date: Feb. 24, 2022

(87) PCT Pub. No.: WO2021/039082
PCT Pub. Date: Mar. 4, 2021

(65) Prior Publication Data
US 2022/0281299 A1 Sep. 8, 2022

(30) Foreign Application Priority Data
Aug. 27, 2019 (JP) .............................. JP2019-154292

(51) Int. Cl.
*B60J 10/84* (2016.01)
*B60J 10/32* (2016.01)
(Continued)

(52) U.S. Cl.
CPC ................ *B60J 10/32* (2016.02); *B60J 7/02* (2013.01); *B60J 10/25* (2016.02); *B60J 10/30* (2016.02);
(Continued)

(58) Field of Classification Search
CPC ... B60J 10/30; B60J 10/32; B60J 10/82; B60J 10/84; B60J 10/85; B60J 7/022; B60J 7/0435
(Continued)

(56) References Cited

U.S. PATENT DOCUMENTS 9,114,689 B2    8/2015  Dietl
2012/0112498 A1 5/2012  Kikuchi et al.
(Continued)

FOREIGN PATENT DOCUMENTS

JP     2012-096765      5/2012
WO    WO 2018/079159    5/2018

OTHER PUBLICATIONS

PCT Written Opinion of the International Searching Authority (w/ English translation) for corresponding PCT Application No. PCT/JP2020/024984, dated Sep. 8, 2020—6 pages.
(Continued)

*Primary Examiner* — Dennis H Pedder
(74) *Attorney, Agent, or Firm* — Dority & Manning, P.A.

(57) ABSTRACT

Increase of an overall thickness of a sunroof unit is suppressed even when a flange portion depending from a side edge of an opening of a roof has a large height. A rear panel contacts an edge of an opening via a rear seal portion. The rear seal portion includes a first seal member mounted to a rear molded part in a rear portion of the opening and a second seal member extending in a fore and aft direction and supported by a frame via a support bracket to form a passage for a stay between the second seal member and the rear molded part in a side portion of the opening. The frame includes a pair of guide walls disposed more inboard than a side edge of the opening and slidably guiding the slider in the fore and aft direction and a vertical wall formed to stand upright at a position more outboard than the side edge of the
(Continued)

opening. The support bracket has a U-shaped cross section opened upward and is disposed to receive a flange portion depending from the side edge of the opening.

7 Claims, 9 Drawing Sheets

(51) Int. Cl.
  *B60J 10/25* (2016.01)
  *B60J 7/02* (2006.01)
  *B60J 10/90* (2016.01)
  *B60J 10/30* (2016.01)
  *B60J 10/82* (2016.01)

(52) U.S. Cl.
  CPC .............. *B60J 10/82* (2016.02); *B60J 10/84* (2016.02); *B60J 10/85* (2016.02); *B60J 10/90* (2016.02)

(58) Field of Classification Search
  USPC .......................................... 296/216.02–216.9
  See application file for complete search history.

(56) References Cited

U.S. PATENT DOCUMENTS

2013/0307296 A1  11/2013  Sawada
2015/0151617 A1   6/2015  Um et al.
2018/0111465 A1   4/2018  Hall

OTHER PUBLICATIONS

PCT International Search Report (w/ English translation) for corresponding PCT Application No. PCT/JP2020/024984, dated Sep. 8, 2020—5 pages.

SUNROOF UNIT

CROSS REFERENCE TO RELATED APPLICATIONS

This application is the U.S. National Stage entry of International Application No. PCT/JP2020/024984 filed under the Patent Cooperation Treaty and having a filing date of Jun. 25, 2020, which claims priority to Japanese Patent Application No. 2019-154292 having a filing date of Aug. 27, 2019, both of which are incorporated herein by reference.

TECHNICAL FIELD

The present disclosure relates to an outer slide type sunroof unit configured to be mounted to a roof of a vehicle such that a front panel slides over a rear panel.

BACKGROUND ART

There is known an outer slide type sunroof device which includes a front cover and a rear cover constituting a part of a vehicle roof such that the front cover slides over the rear cover (see Patent Document 1). In this sunroof device, a roof seal is attached to the roof to surround the roof opening peripherally and a cover seal is attached to the side edge of the rear cover so as to contact the roof seal, whereby the gap between the roof and the rear cover is sealed. When the front cover slides rearward over the rear cover, a lever (support member) of the mounting device of the front cover moves between the roof seal and the cover seal, so that the front cover is allowed to slide a large distance in the rearward direction.

In the sunroof device having such a structure, when installing the sunroof unit to the roof, it is necessary to attach the roof seal to the roof, which is a part of the vehicle body, and thus, the installation work is cumbersome. In other words, a structure in that the all seal members are provided on the sunroof unit is desirable. As an outer slide type sunroof unit having such a structure, a sunroof unit is known in which weather strips (seal members) each including a first seal portion for resiliently contacting an outer peripheral edge of the movable panel (front panel) or the fixed panel (rear panel) and a second seal portion for resiliently contacting an edge of the roof opening are fitted to respective vertical walls formed to stand upwardly from a guide rail or from a front housing or the like, which are part of the sunroof unit (see Patent Document 2). In this sunroof unit, a link member supporting the front panel moves in the fore-and-aft direction between the vertical wall and the rear panel by resiliently deforming the first seal portion.

However, in the sunroof unit disclosed in Patent Document 2, the seal members and the vertical walls supporting them need to be provided along the entire circumference of the front and rear panels so as to surround these panels, and thus, the seal structure is complex. Further, in a case where there is a manufacturing error in the roof, it is necessary to adjust the heights of the fixed panel and the seal members such that they are aligned with the roof, but in the sunroof unit disclosed in Patent Document 2, it is not possible to adjust the heights of the seal members.

To address such problems, the Applicant has proposed a sunroof unit in which a rear seal portion of the rear panel includes a first seal member mounted to a side edge of the rear molded part, a second seal member mounted to a rear edge of the rear molded part, and a third seal member provided on an outboard side of the first seal member, and the third seal member includes a first portion that has a rear end joined to a lateral end of the second seal member and resiliently contacts an inner edge of the opening of the roof and a second portion that resiliently contacts an outer side of the first seal member and cooperates with the first seal member to define a passage for a stay that supports the front pane (Patent Document 3). In this sunroof unit, the third seal member is supported by the frame of the sunroof unit via a support bracket and the support bracket is fixed to the frame on an outboard side of the rear panel (namely, below the roof), whereby the slider can move below the side edge of the rear panel without being obstructed by the support bracket.

PRIOR ART DOCUMENT(S)

Patent Document(s)

[Patent Document 1] U.S. Pat. No. 9,114,689B2
[Patent Document 2] US2013/0307296A1
[Patent Document 3] WO2018/079159A1

SUMMARY OF THE INVENTION

Task to be Accomplished by the Invention

However, in the sunroof unit described in Patent Document 3, when the flange portion depending from the side edge of the opening of the roof of the vehicle has a large height, the height dimension of the support bracket also becomes large in accordance with the height of the flange portion. As a result, an overall thickness of the sunroof unit becomes large.

In view of such background, an object of the present invention is to provide a sunroof unit that can suppress increase of the overall thickness even when the flange portion depending from the side edge of the opening of the roof has a large height.

Means to Accomplish the Task

To achieve such an object, one embodiment of the present invention provides a sunroof unit (10) for at least partially opening and closing an opening (3) formed in a roof (2) of a vehicle (1), the sunroof unit comprising: a frame (20) configured to be disposed below the roof so as to be aligned with the opening; a rear panel (12) secured to the frame to close a rear portion of the opening; and a front panel (11) that includes a stay (63) depending from a side portion thereof and is supported by the frame via the stay so as to be slidable between a closed position to close a front portion of the opening and an open position where the front panel overlaps on top of the rear panel to open the front portion of the opening. The rear panel includes a rear panel main body (16) and a rear molded part (17) provided on an outer peripheral edge of the rear panel main body and contacts an edge of the opening via a rear seal portion (18). The rear seal portion includes a first seal member (31) mounted to the rear molded part in a rear portion of the opening and a second seal member (32) extending in a fore and aft direction and supported by the frame via a support bracket (33) to form a passage (64) for the stay between the second seal member and the rear molded part in a side portion of the opening. The frame includes a pair of guide walls (41A, 41B) disposed more inboard than a side edge of the opening and slidably guiding a slider (40), which supports the stay, in the fore and aft direction below the passage and a vertical wall (43)

formed to stand upright at a position more outboard than the side edge of the opening, the frame being fixed to the roof such that a flange portion (4) depending from the side edge of the opening is received between the vertical wall and an outboard one (41A) of the guide walls. The support bracket has a U-shaped cross section opened upward, is disposed to receive the flange portion, supports the second seal member on an inboard side thereof, and is attached to the vertical wall on an outboard side thereof.

According to this configuration, since the first seal member is mounted to the rear molded part in the rear portion of the opening, it is unnecessary to provide the frame with a vertical wall in the rear portion of the opening in order to support the first seal member. Also, the second seal member is supported by the frame via the support bracket in the side portion of the opening. Thus, the all seal members are provided on the sunroof unit side with a simple configuration. Further, the support bracket is disposed to receive the flange portion, whereby the support bracket can be disposed so as not to interfere with the flange portion of the roof or the slider, and even when the flange portion has a large height, increase of the overall thickness of the sunroof unit can be suppressed.

Preferably, the vertical wall (43) is formed with an elongated hole (61) that extends in a vertical direction, and the support bracket (33) is fastened to the vertical wall in a height adjustable manner by a fastening member (62) penetrating through the elongated hole.

According to this configuration, with a simple configuration in that the vertical wall of the frame is formed with an elongated hole, the support bracket can be attached to the vertical wall such that the height thereof can be adjusted continuously. Therefore, the height of the second seal member can be adjusted in the side portion of the opening to remove a step between the second seal member and the roof.

Preferably, the frame (20) has a drainage groove (44) formed below the side edge of the opening by the vertical wall (43) and the outboard one (41A) of the guide walls, and a lower portion of the support bracket (33) is disposed in the drainage groove.

According to this configuration, a drainage groove is formed on an outboard side of the part where the slider slides and below the flange portion, whereby even if water intrudes between the second seal member and the side edge of the opening, the water is drained forward or rearward by the drainage groove. Therefore, it is possible to prevent water from accumulating in the part where the slider slides.

Preferably, the support bracket (33) includes an outer vertical wall (56) attached to the vertical wall (43), an inner vertical wall (57) supporting the second seal member, and a connecting wall (58) that connects a lower end of the inner vertical wall and a lower end of the outer vertical wall to each other, and a position of a lower end of the elongated hole (61) is set such that the connecting wall is spaced upward from the frame (20) in a state in which the support bracket is attached to the vertical wall at a lowermost position.

According to this configuration, even when the support bracket is attached to the vertical wall at the lowermost position, a space is formed below the support bracket, and this space functions as a drainage groove. Therefore, water is drained smoothly without being obstructed by the support bracket.

Preferably, the connecting wall (58) includes multiple lateral ribs (66) extending in a width direction and multiple drainage holes (67) formed between the lateral ribs.

According to this configuration, the multiple lateral ribs allow the connecting wall to be formed with the multiple drainage holes while suppressing reduction of stiffness of the connecting wall. Due to the formation of the multiple drainage holes in the connecting wall, the water that has intruded from the side edge of the opening is discharged from the drainage holes without flowing within the support bracket with a U-shaped cross section over the entire length thereof and is smoothly drained by the drainage groove located below.

Preferably, the outer vertical wall (56) includes two fastening portions (68) respectively disposed at a front portion and a rear portion, a protruding portion (69) that protrudes in an inboard direction between the two fastening portions, and multiple vertical ribs (70) formed on the protruding portion so as to protrude in the inboard direction and to extend in the vertical direction.

According to this configuration, the outer vertical wall contacts the vertical wall of the frame only at the two fastening portions. Thereby, when the vehicle vibrates, the parts other than the fastening portions are prevented from generating abnormal noise by contacting or sliding along the vertical wall. Also, the multiple vertical ribs formed on the protruding portion suppress reduction of stiffness of the outer vertical wall fastened to the vertical wall at the two fastening portions.

Effect of the Invention

Thus, according to the above configuration, it is possible to provide a sunroof unit that can suppress increase of the overall thickness even if the flange portion depending from the side edge of the opening of the roof has a large height.

MODE(S) FOR CARRYING OUT THE INVENTION

In the following, an embodiment of the present invention will be described in detail with reference to the drawings.

Figure 1:
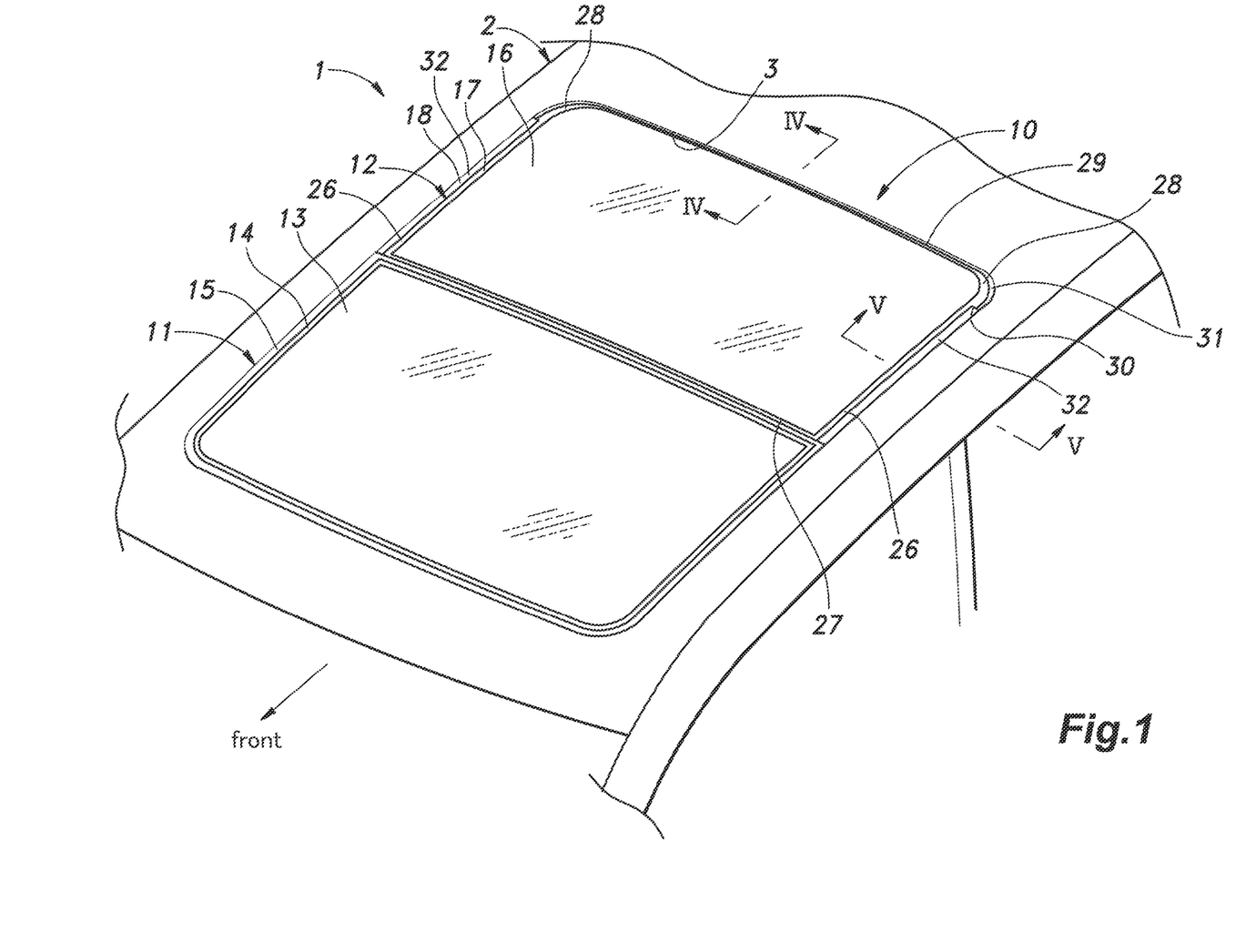
FIG. 1 is a perspective view showing a closed state of a sunroof unit installed to a roof.

FIG. 1 is a perspective view showing a closed state of a sunroof unit 10 installed to a roof 2 of a motor vehicle 1. A rectangular opening 3 is formed in the roof 2 of the motor vehicle 1, and the sunroof unit 10 is installed to the roof 2 to close the opening 3. In the following description, the front-rear, left-right, and up-down directions are defined with respect to the motor vehicle 1 having the sunroof unit 10 installed to the roof 2. With respect to the vehicle width direction of the motor vehicle 1, which corresponds to the lateral direction, a side closer to the center of the motor vehicle 1 may be referred to as an inboard side, and an outer side of the motor vehicle 1 may be referred to as an outboard side. The sunroof unit 10 is substantially left and right symmetric, and the details of the symmetric structures will be described while showing the structures on the left side in the drawings.

The sunroof unit 10 includes a front panel 11 for closing a front portion of the opening 3 and a rear panel 12 for closing a rear portion of the opening 3. The front panel 11 and the rear panel 12 are arranged along the roof 2 such that their upper 10 surfaces are aligned with the upper surface of the roof 2. The front panel 11 is a movable panel that is movable relative to the roof 2, while the rear panel 12 is a fixed panel that is not movable relative to the roof 2.

The front panel 11 includes a front panel main body 13 formed of a glass plate, an annular front molded part 14 made of resin and provided on an outer peripheral edge of the front panel main body 13, and a front seal portion 15 made of an elastic material and provided on an outer peripheral edge of the front molded part 14. The rear panel 12 includes a rear panel main body 16 formed of a glass plate and an annular rear molded part 17 made of resin and provided on an outer peripheral edge of the rear panel main body 16, and contacts an edge of the opening 3 via a rear seal portion 18 made of an elastic material and provided on an outer peripheral edge of the rear molded part 17. The front seal portion 15 and the rear seal portion 18 cooperate with each other to form an annular seal portion around an outer circumference of the front panel 11 and the rear panel 12 and to form a seal portion between the front panel 11 and the rear panel 12.

In this embodiment, the front seal portion 15 is provided to extend over the entire circumference of the outer peripheral edge of the front molded part 14 in a rectangular annular shape. On the other hand, the rear seal portion 18 is provided to extend in a U-shape along the rear portion and the two side portions that are a part of the outer peripheral edge of the rear molded part 17. Namely, the seal portion between the front panel 11 and the rear panel 12 is formed as a part of the front seal portion 15. In another embodiment, the seal portion between the front panel 11 and the rear panel 12 may be formed as a part of the rear seal portion 18.

Figure 2:
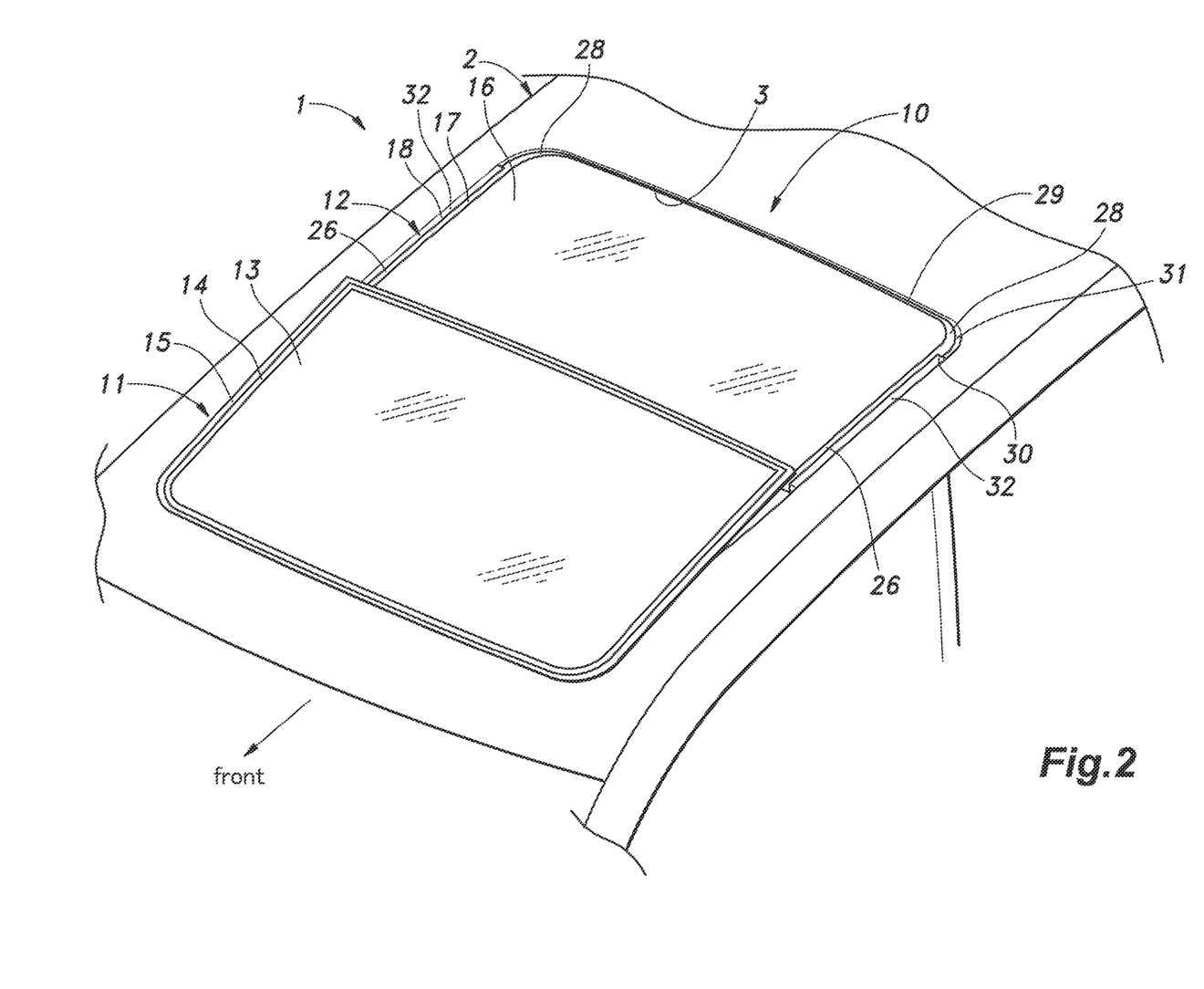
FIG. 2 is a perspective view showing a tilt-up state of the sunroof unit shown in FIG. 1.
Figure 3:
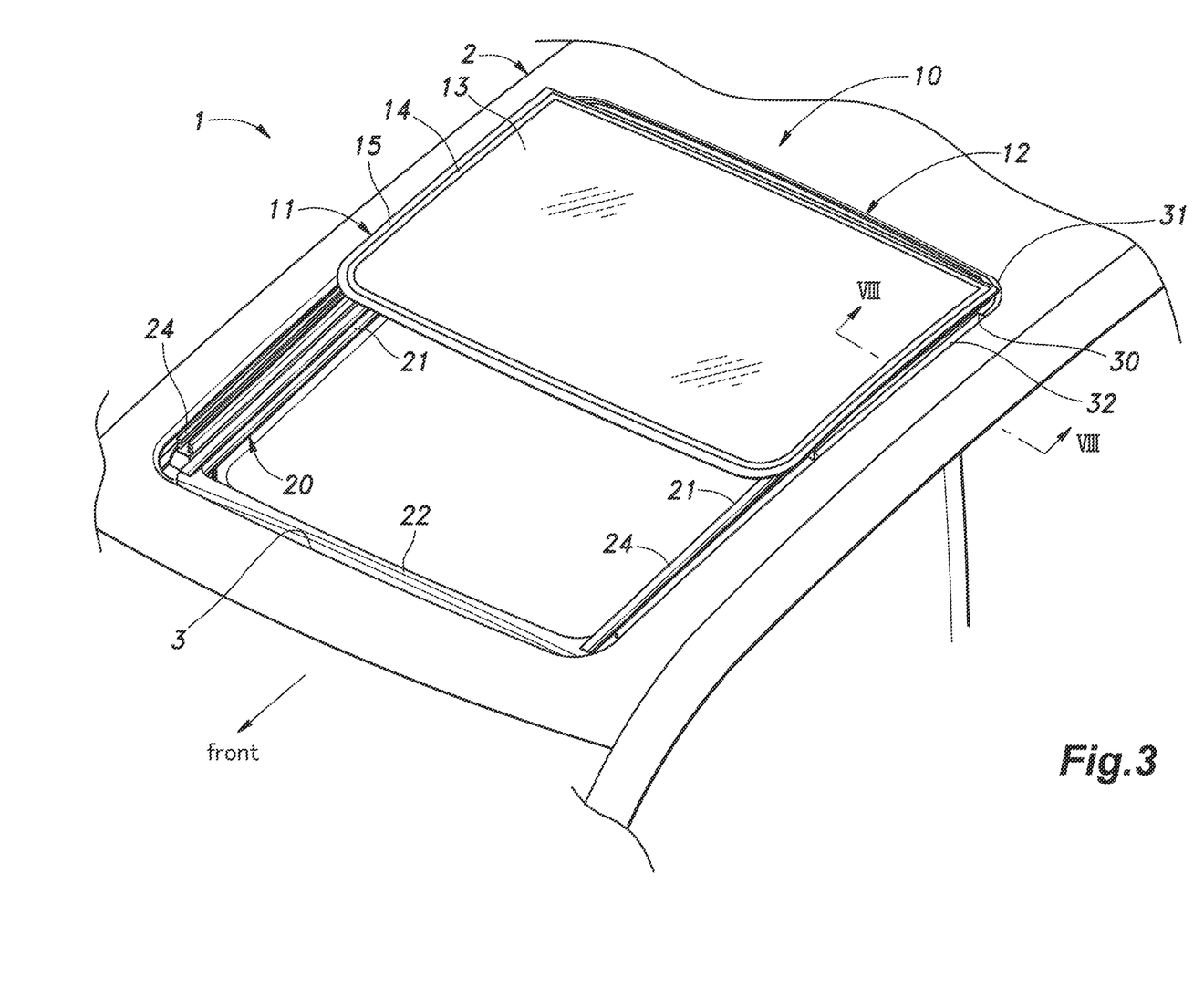
FIG. 3 is a perspective view showing an open state of the sunroof unit shown in FIG. 1.

When driven by a known slide mechanism in an opening direction, the front panel 11 is moved from a closed position shown in FIG. 1, at which the front panel 11 closes the front portion of the opening 3, to a tilt-up position shown in FIG. 2, at which the rear portion of the front panel 11 is raised, and then, slides over the rear panel 12 rearward to move to an open position shown in FIG. 3, at which the front panel 11 overlaps on top of the rear panel 12 and opens the front portion of the opening 3. On the other hand, when driven by the slide mechanism in a closing direction, the front panel 11 slides forward over the rear panel 12 from the open position shown in FIG. 3 to the closed position shown in FIG. 1 via the tilt-up position shown in FIG. 2. Thus, the front panel 11 is configured to be slidable between the closed position shown in FIG. 1 and the open position shown in FIG. 3, and the sunroof unit 10 can partially open and close the front portion of the opening 3.

As shown in FIG. 3, a frame 20 that supports the front panel 11 and the rear panel 12 is mounted below the roof 2 such that the frame 20 is aligned with the opening 3 of the roof 2. The frame 20 is formed to have a rectangular annular shape extending along the opening 3, and includes left and right side frames 21 extending in the fore-and-aft direction along the respective side edges of the opening 3, a front frame 22 (FIG. 4) connecting the front ends of the left and right side frames 21 to each other, and a rear frame 23 (FIG. 4) connecting the rear ends of the left and right side frames 21 to each other. Each side frame 21 is integrally provided with a guide rail 24 extending in the fore-and-aft direction.

A drive source including an electric motor and a reduction drive mechanism is mounted at an intermediate portion of the rear frame 23 in the lateral direction. the output end of the drive source is engaged with left and right push-pull cables 25 (FIG. 5) for driving the front panel 11. The push-pull cables 25 extend from the output end of the drive source along the rear frame 23 in the outboard direction, are passed through left and right guide pipes to be curved forward, and then extend forward in the left and right guide rails 24.

As shown in FIGS. 1 and 2, the rear panel main body 16 has a substantially rectangular shape with the rear left and right corners thereof being rounded. The rear molded part 17 includes left and right molded side portions 26 extending in the fore and aft direction along left and right outer side edges of the rear panel main body 16, respectively, a molded front portion 27 connecting the front ends of the left and right molded side portions 26 to each other, and a molded rear portion 29 connecting the rear ends of the left and right molded side portions 26 to each other via left and right curved molded corner portions 28.

Figure 6:
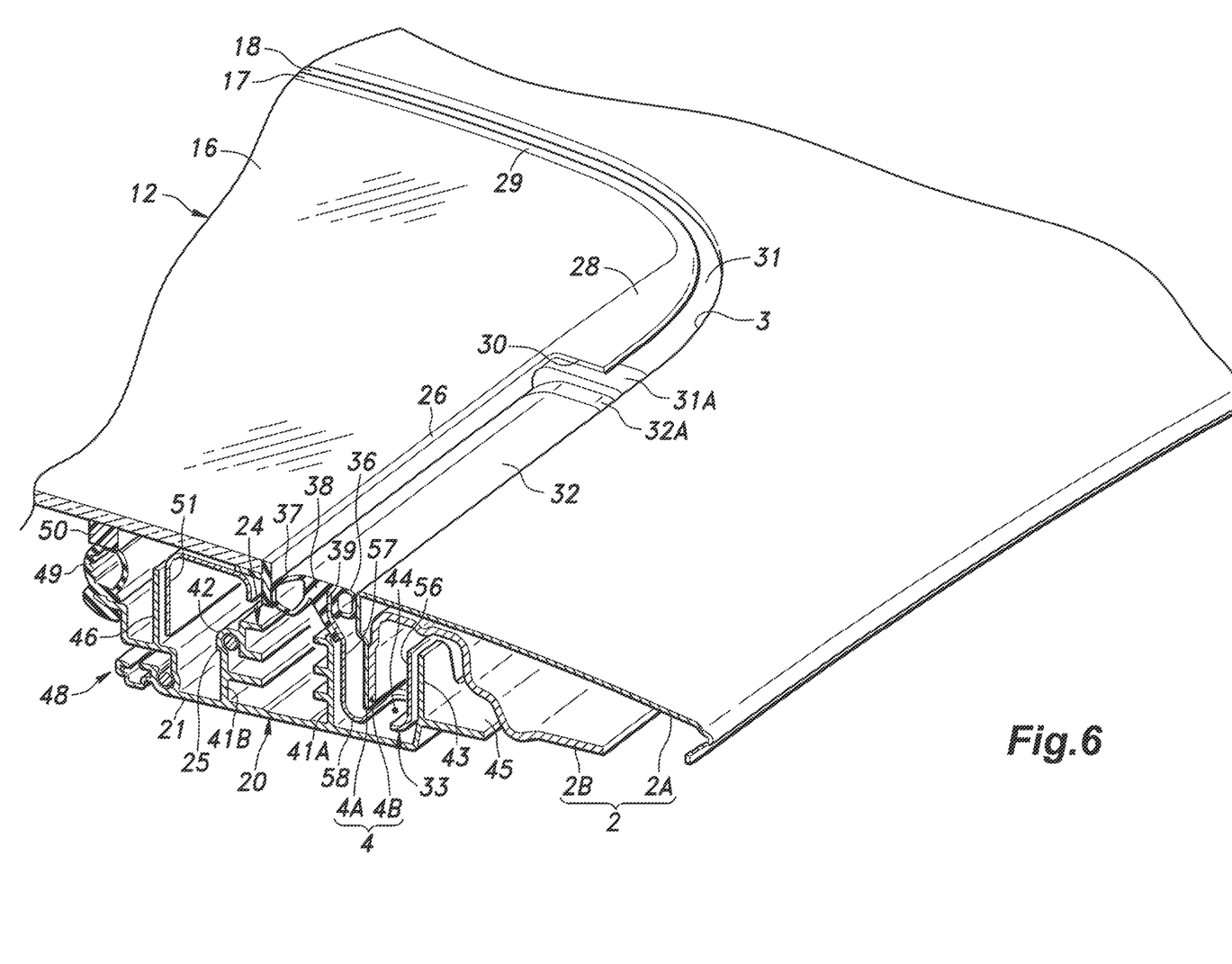
FIG. 6 is a perspective view of a main part of the roof cut along line V-V in FIG. 1.

Each molded side portion 26 has a smaller width than the front end of the associated molded corner portion 28 and is connected to an inboard side of the front end of the molded corner portion 28 (see FIG. 6 also). In other words, each molded side portion 26 is provided with a cutout 30 that extends in the fore and aft direction from the front end of the associated molded corner portion 28 to the front edge of the rear molded part 17. The inboard-side edge of the cutout 30 extending in the fore and aft direction makes a side edge of the rear molded part 17.

The rear seal portion 18 includes a first seal member 31 provided along a rear edge of the rear molded part 17 and curved forward along the molded corner portions 28 of the rear molded part 17 and a pair of second seal members 32 extending along the respective side edges of the rear molded part 17.

The first seal member 31 has a pair of left and right lateral ends 31A (FIG. 6). Each lateral end 31A is provided to cover the front end of the associated molded corner portion 28 of the rear molded part 17, namely, the rear end of the associated cutout 30 of the rear molded part 17 and faces forward. In other words, each cutout 30 is formed to extend from the associated lateral end 31A of the first seal member 31 to the front edge of the rear molded part 17.

Each second seal member 32 is provided on the frame 20 such that the outer and inner edges thereof are respectively aligned with the outer and inner edges of the associated lateral end 31A of the first seal member 31. Specifically, each second seal member 32 is mounted to the frame 20 via an associated one of left and right support brackets 33 (FIG. 5) respectively attached to the left and right side frames 21, and is disposed such that only an inner portion thereof (second seal main body 37, which will be described later) extends in the fore and aft direction in the cutout 30. The detailed structure of the second seal member 32 and the support bracket 33 will be described later.

Figure 4:
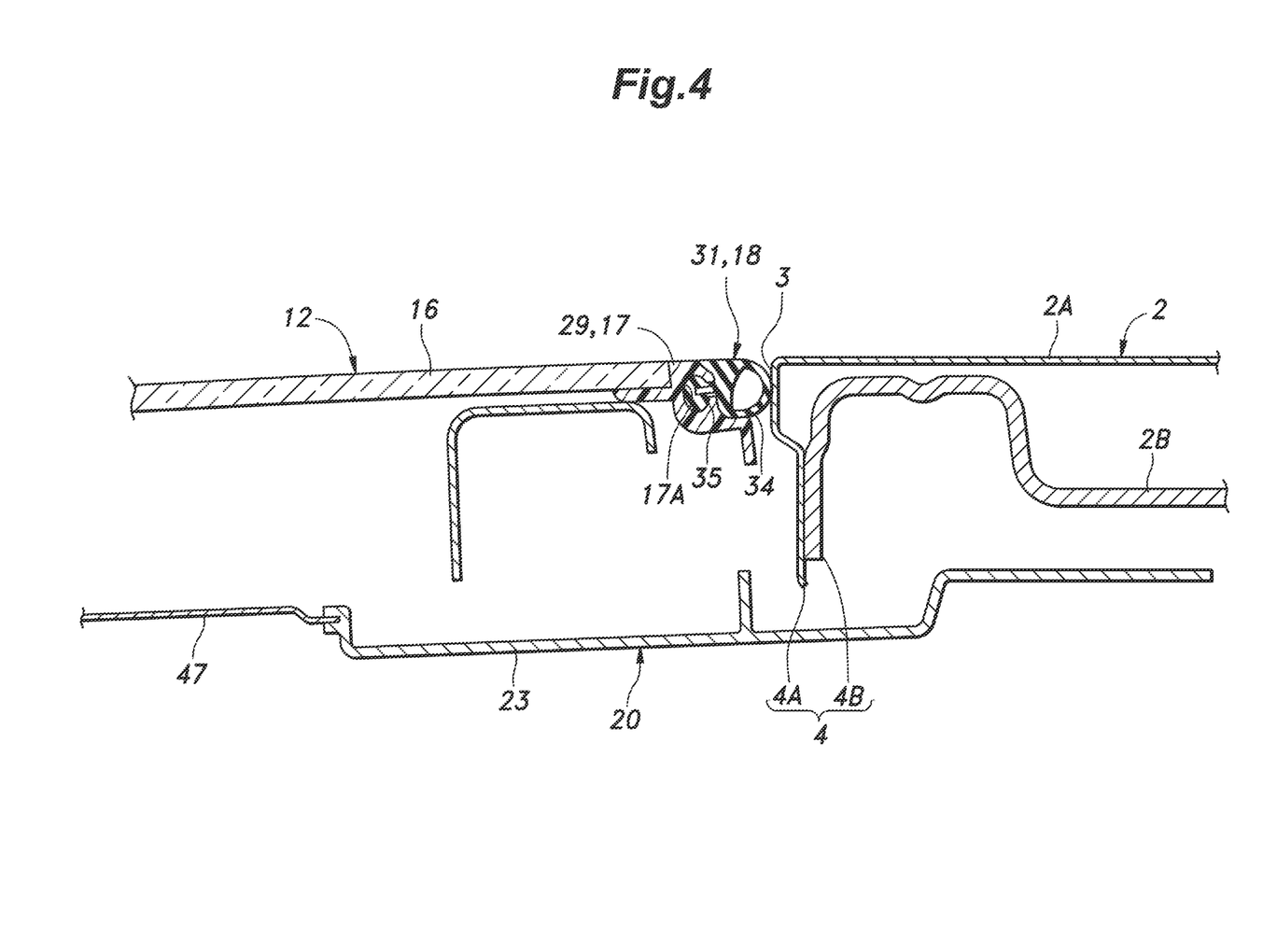
FIG. 4 is a sectional view taken along line IV-IV in FIG. 1.

FIG. 4 is a sectional view taken along line IV-IV in FIG. 1. As shown in FIG. 4, the first seal member 31 is an extrusion molded product of an elastic material, and has a constant cross-sectional shape. The first seal member 31 includes a seal main body 34 in the shape of letter D convex in the outboard direction and a fitting portion 35 formed integrally on the inboard side of the seal main body 34 so as to be fitted in a mounting groove 17A formed in the peripheral edge of the rear molded part 17. The seal main body 34 of the first seal member 31 resiliently contacts the rear edge of the opening 3 of the roof 2.

Figure 5:
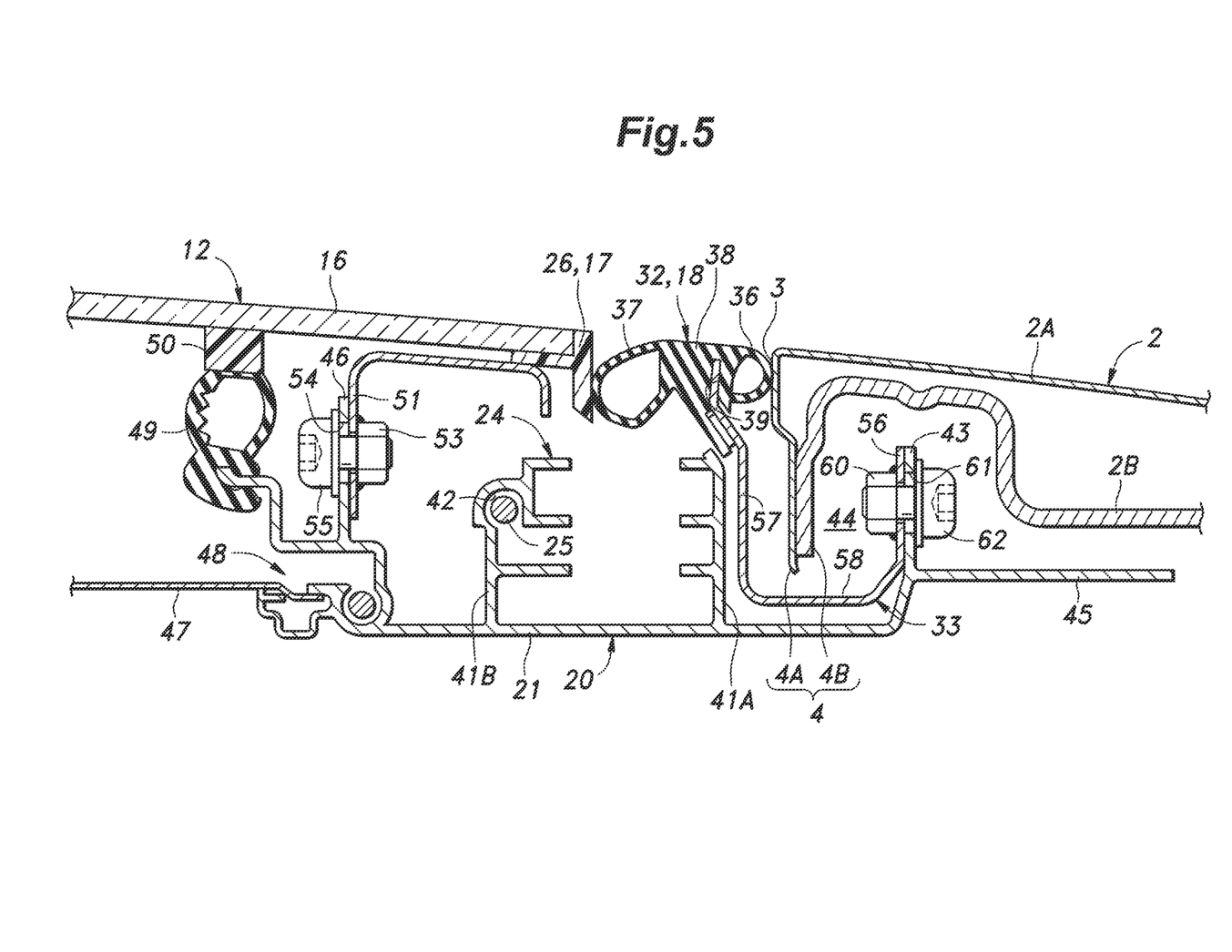
FIG. 5 is a sectional view taken along line V-V in FIG. 1.

FIG. 5 is a sectional view taken along line V-V in FIG. 1 and FIG. 6 is a perspective view of a main part of the roof 2 cut along line V-V in FIG. 1. As shown in FIGS. 4 to 6, the roof 2 is constituted of an outer panel 2A and an inner panel 2B. The outer panel 2A has an outer flange portion 4A extending along and depending from the periphery of the opening 3. The inner panel 2B is formed in a bead shape to reinforce the outer panel 2A and is welded to the outer panel 2A at appropriate positions. The inner panel 2B has an inner flange portion 4B depending along the outer flange portion 4A, and the inner flange portion 4B is joined to the outer flange portion 4A by spot welding. The outer flange portion 4A and the inner flange portion 4B constitute a flange portion 4 of the roof 2 which depends from the periphery of the opening 3.

As shown in FIGS. 5 and 6, each second seal member 32 includes a first seal main body 36 in the shape of letter D convex in the outboard direction and a second seal main body 37 substantially in the shape of letter D convex in the inboard direction and connected to an upper part of the first seal main body 36 via a connecting portion 38. The first seal main body 36, the second seal main body 37, and the connecting portion 38 are formed integrally with each other. The first seal main body 36 has a cross-sectional shape substantially the same as that of the seal main body 34 of the first seal member 31 (FIG. 4). In the present embodiment, the rear end of the first seal main body 36 resiliently contacts the lateral end 31A of the first seal member 31. In another embodiment, the rear end of the first seal main body 36 may be joined to the lateral end 31A of the first seal member 31 by welding. The second seal main body 37 has a larger width dimension than the first seal main body 36 so as to be capable of undergoing greater elastic deformation than the first seal main body 36. The connecting portion 38 of each second seal member 32 is formed with a support groove 39 opened on the underside of the second seal member 32.

Figure 7:
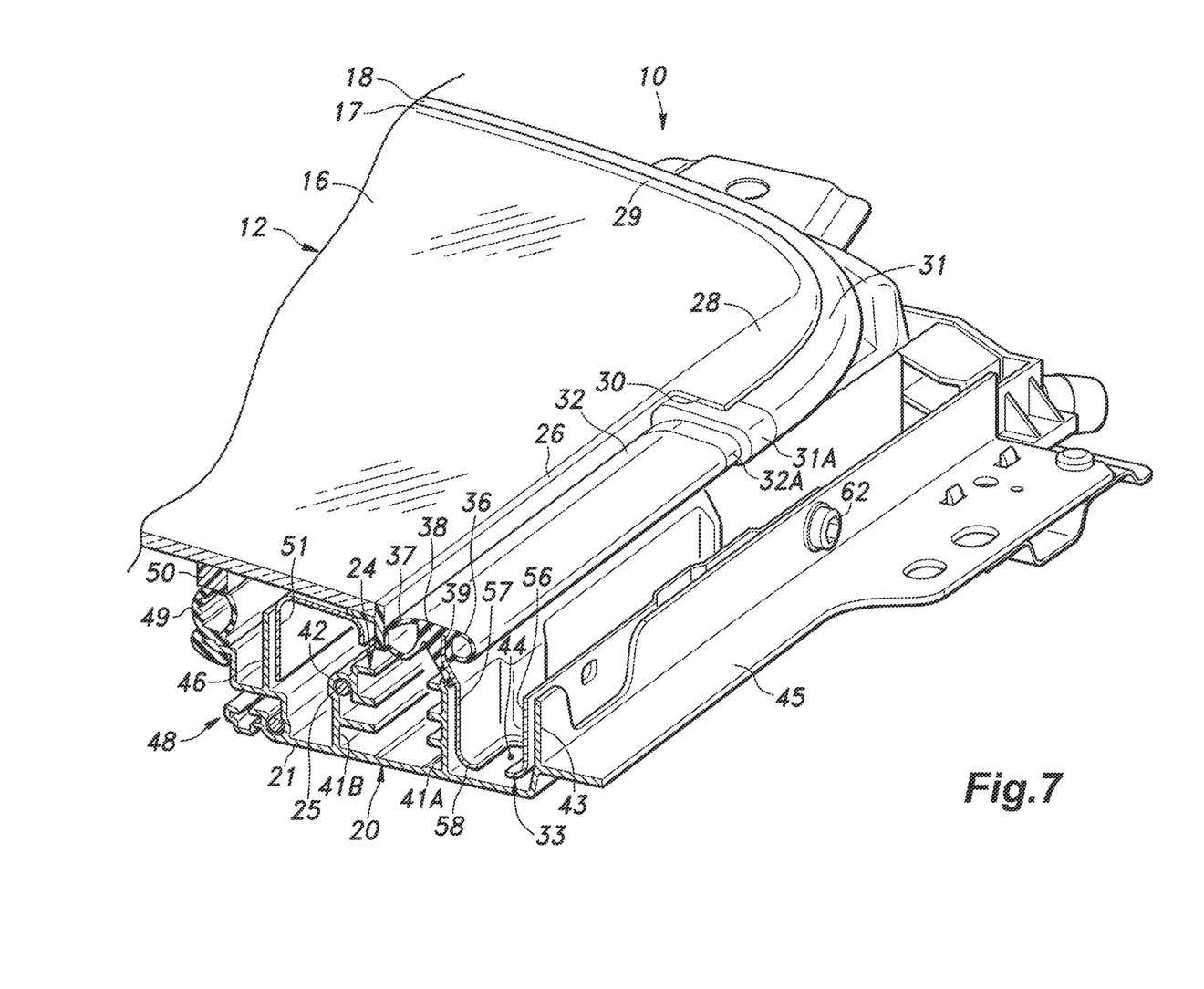
FIG. 7 is a cut perspective view of a main part of the sunroof unit corresponding to FIG. 6.

FIG. 7 is a cut perspective view of a main part of the sunroof unit 10 corresponding to FIG. 6. As shown in FIGS. 5 and 7, each side frame 21 is an extrusion molded product of an aluminum alloy and includes a pair of guide walls 41 (41A, 41B) that sandwiches an associated slider 40 (FIG. 8) from left and right to slidably guide the slider in the fore and aft direction, so that the pair of guide walls 41 constitutes the guide rail 24. The pair of guide walls 41 is constituted of an outer guide wall 41A disposed on the outboard side and an inner guide wall 41B disposed on the inboard side. The inner guide wall 41B is formed with a cable guide groove 42 for guiding the push-pull cable 25. The pair of guide walls 41 is disposed more inboard than the side edge of the opening 3.

On the outboard side of the pair of guide walls 41 of each side frame 21, a vertical wall 43 standing upright to extend upward is formed integrally. The vertical wall 43 is disposed more outboard than the side edge of the opening 3, and a drainage groove 44 is formed between the vertical wall 43 and the outer guide wall 41A. Therefore, the drainage groove 44 is formed below each side edge of the opening 3, whereby even if water intrudes between the second seal member 32 and the roof 2 (the side edge of the opening 3), the water is captured by the associated drainage groove 44. The water captured by the drainage groove 44 is drained forward or rearward by the drainage groove 44. Thereby, it is possible to prevent water from accumulating in a part between the pair of guide walls 41 where the slider 40 slides.

At an intermediate position of each vertical wall 43 in the height direction, a mounting extension part 45 that extends out in the outboard direction to be attached to the roof 2 is integrally formed. With the mounting extension part 45 fastened to the inner panel 2B of the roof 2 from below, each side frame 21 is fixed to the roof 2 at a height position where the flange portion 4 of the roof 2 protrudes into the drainage groove 44 from above.

On the inboard side of the pair of guide walls 41 of each side frame 21, a support wall 46 standing upright to extend upward to support the rear panel 12 is formed integrally. A shade guide rail 48 for guiding a sunshade 47 (FIG. 5) is integrally formed at the lower end of each support wall 46. A shield member 49 for closing a gap between each side frame 21 and the rear panel main body 16 to hide the gap from view is mounted to an inner edge of each side frame 21 extending in the inboard direction from an intermediate position of the support wall 46 in the height direction. The shield member 49 consists of an elastic member and resiliently contacts the lower surface of the rear panel main body 16 (in the illustrated example, the lower surface of a resin mold 50 which is glued to the lower surface of the rear panel main body 16).

As shown in FIG. 5, the rear panel 12 is fixed to the support wall 46 of each side frame 21 in a height adjustable manner by support pillars 51 each made of a steel plate and depending from one of the four corners of the rear molded part 17. Specifically, each support pillar 51 is formed with a bolt insertion hole penetrating therethrough in the vehicle width direction, and a nut 53 is fixed by welding to the outboard side surface of the support pillar 51 at a position corresponding to the bolt insertion hole. The support wall 46 is formed with an elongated hole 54 extending in the vertical direction. The support pillar 51 is disposed on the outboard side of the support wall 46 and, with a bolt 55 inserted through the elongated hole 54 from the inboard side of the support wall 46 being engaged with the nut 53, the support pillar 51 is fixed to the support wall 46 such that the height thereof can be adjusted continuously within a range determined by the length of the elongated hole 54.

Note that when the sunroof unit 10 is installed to the roof 2, the shield member 49 is attached to the side frame 21 after the height of the rear panel 12 relative to the frame 20 is adjusted such that the rear panel 12 is aligned with the roof 2 and the bolts 55 are fastened. Therefore, the shield member 49 does not interfere with the height adjustment of the rear panel 12.

As described above, each second seal member 32 is mounted to the associated side frame 21 via the associated support bracket 33. Each support bracket 33 is a press molded product formed by press-molding a steel plate, has a U-shaped cross section opened upward, and has a length in the fore and aft direction substantially the same as that of the second seal member 32. The support bracket 33 includes an outer vertical wall 56 extending in the vertical direction and attached to the vertical wall 43 of the side frame 21, an inner vertical wall 57 extending in the vertical direction and supporting the second seal member 32 at a position between the side edge of the rear molded part 17 and the side edge of the opening 3 of the roof 2 opposing the side edge of the rear molded part 17, and a connecting wall 58 extending in the lateral direction to connect the lower end of the outer vertical wall 56 and the lower end of the inner vertical wall 57 to each other.

The support bracket 33 is attached to the side frame 21 such that the lower portion thereof is disposed in the drainage groove 44. The sunroof unit 10 is fixed to the roof 2 such that the support bracket 33 receives the flange portion 4 of the roof 2. Thereby, the support bracket 33 can be disposed without interfering with the flange portion 4 of the roof 2 and the pair of guide walls 41. Also, increase of the overall thickness of the sunroof unit 10 can be suppressed even when the flange portion 4 has a large height.

Each second seal member 32 is mounted to the associated support bracket 33 such that the inner vertical wall 57 enters the support groove 39, and is fixed the associated support bracket 33 with the first seal main body 36 and the connecting portion 38 being bonded to the inner vertical wall 57 by an adhesive. The front end and the rear end of the second seal member 32 are closed by respective end members 32A (FIG. 9), and the inner vertical wall 57 of the support bracket 33 is slightly shorter than the second seal member 32. In the state in which the second seal member 32 is mounted to the support bracket 33, the first seal main body 36 resiliently contacts the side edge of the opening 3 of the roof 2, and the second seal main body 37 resiliently contacts the associated side edge of the rear molded part 17.

Each second seal member 32 is fixed to the vertical wall 43 of the side frame 21 via the support bracket 33 in a height adjustable manner. Specifically, the outer vertical wall 56 of the support bracket 33 is formed with a bolt insertion hole penetrating therethrough in the vehicle width direction, and a nut 60 is fixed by welding to the inboard side surface of the outer vertical wall 56 at a position corresponding to the bolt insertion hole. The vertical wall 43 is formed with an elongated hole 61 extending in the vertical direction. The outer vertical wall 56 is disposed on the inboard side of the vertical wall 43 and, with a bolt 62 inserted through the elongated hole 61 from the outboard side of the vertical wall 43 being engaged with the nut 60, the outer vertical wall 56 is fixed to the vertical wall 43 such that the height thereof can be adjusted continuously within a range determined by the length of the elongated hole 61.

Thus, with a simple configuration in which the vertical wall 43 of the frame 20 is formed with the elongated hole 61, a height adjustment mechanism for mounting the support bracket 33 to the vertical wall 43 such that the height thereof can be adjusted continuously is realized. Also, since the support bracket 33 disposed on the inboard side of the vertical wall 43 has the nut 60 fixed to the inboard side surface thereof and is fastened to the vertical wall 43 by the bolt 62 (fastening member) that engages with the nut 60, the fastening work of the bolt 62 can be performed without interfering with the pair of guide walls 41. Therefore, adjustment of the height of the second seal member 32 disposed on the side portion of the opening 3 is easy.

The position of the lower end of the elongated hole 61 is set such that the connecting wall 58 is spaced upward from the frame 20 in a state in which the support bracket 33 is attached to the vertical wall 43 at the lowermost position, namely, in a state in which the bolt 62 is in contact with the lower end of the elongated hole 61. Thereby, even if the support bracket 33 is attached to the vertical wall 43 at the lowermost position, a space is formed below the support bracket 33, and this space functions as a drainage channel of the drainage groove 44. Therefore, water is drained smoothly without being obstructed by the support bracket 33.

Figure 8:
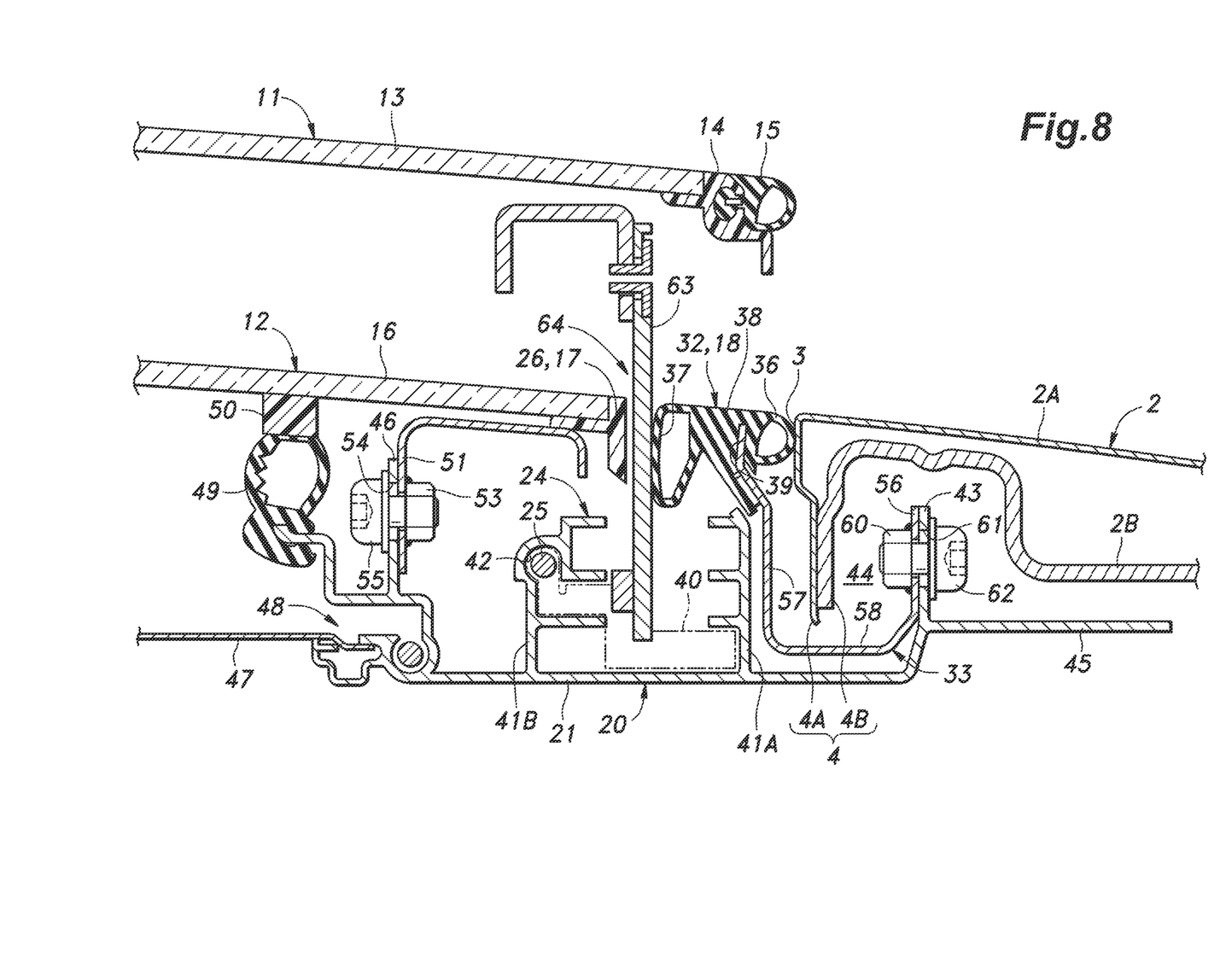
FIG. 8 is a sectional view taken along line VIII-VIII in FIG. 3.

FIG. 8 is a sectional view taken along line VIII-VIII in FIG. 3, which is a sectional view corresponding to FIG. 5 but showing the sunroof unit 10 in the open state. As shown in FIG. 8, the front panel 11 includes a pair of stays 63 depending from left and right side portions thereof, respectively, and is guided by the guide rails 24 via a pair of sliders 40 supporting the respective stays 63, whereby the front panel 11 is slidably supported by the frame 20 via the stays 63 and the sliders 40. When the front panel 11 is moved from the tilt-up position shown in FIG. 2 to the open position shown in FIG. 3, each stay 63 lifting up the rear portion of the front panel 11 enters between the side edge of the rear molded part 17 and the second seal main body 37 of the second seal member 32 on the same lateral side of the sunroof unit 10. Namely, the second seal main body 37 of the second seal member 32 cooperates with the rear molded part 17 to define a passage 64 for the stay 63.

Figure 9:
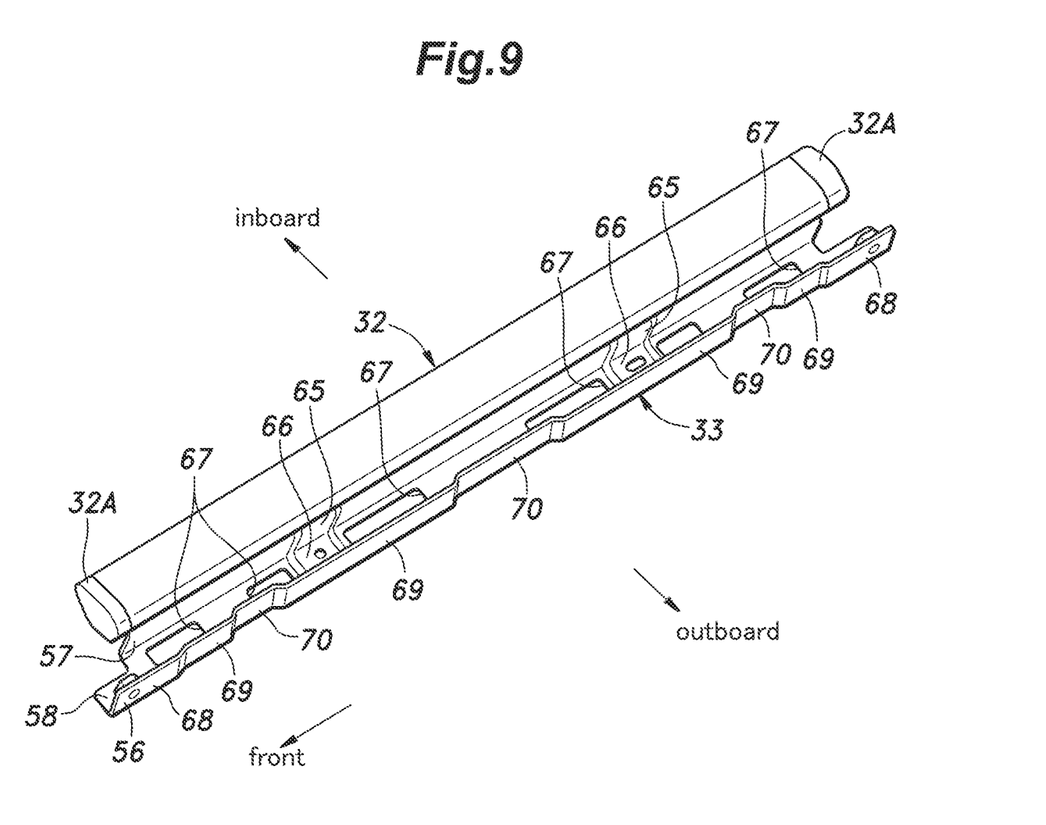
FIG. 9 is a perspective view of a support bracket and a second seal member.

FIG. 9 is a perspective view of the support bracket 33 and the second seal member 32. As shown in FIG. 9, the inner vertical wall 57 is formed with multiple inner vertical ribs 65 each protruding in the outboard direction and extending in the vertical direction. The connecting wall 58 is formed with multiple lateral ribs 66 each protruding upward and extending in the width direction. The multiple lateral ribs 66 are formed to be continuous with the multiple inner vertical ribs 65. Further, the connecting wall 58 is formed with multiple drainage holes 67 positioned between the lateral ribs 66. In this way, the multiple lateral ribs 66 allow the connecting wall 58 to be formed with the multiple drainage holes 67 while suppressing reduction of stiffness of the connecting wall 58. Thereby, as shown in FIG. 5, the water that has intruded from the side edge of the opening 3 is discharged from the drainage holes 67 without flowing within the support bracket 33 with a U-shaped cross section over the entire length of thereof and is smoothly drained by the drainage groove 44 located below.

As shown in FIG. 9, the outer vertical wall 56 includes two fastening portions 68 respectively disposed at the front portion and the rear portion, a protruding portion 69 that protrudes in the inboard direction between the two fastening portions 68, and multiple vertical ribs 70 formed on the protruding portion 69 so as to protrude in the inboard direction and to extend in the vertical direction. Therefore, the outer vertical wall 56 is fastened to the vertical wall 43 of the frame 20 and contacts the vertical wall 43 only at the two fastening portions 68. Thereby, when the motor vehicle 1 vibrates, the parts other than the fastening portions 68 are prevented from generating abnormal noise by contacting or sliding against the vertical wall 43. Also, the multiple vertical ribs 70 formed on the protruding portion 69 suppress reduction of stiffness of the outer vertical wall 56 fastened to the vertical wall 43 at the two fastening portions 68.

The sunroof unit 10 is configured as described above. As shown in FIG. 1, since the first seal member 31 is mounted to the rear molded part 17 in the rear portion of the opening 3, it is unnecessary to provide the frame 20 with the vertical wall 43 in the rear portion of the opening 3 in order to support the first seal member 31. Therefore, the seal structure is simple. Further, as also shown in FIG. 5, the second seal member 32 is supported by the frame 20 via the support bracket 33 in the side portion of the opening 3. Thus, the all seal members are provided on the sunroof unit 10 side with a simple configuration.

The height position of the first seal member 31 can be adjusted together with the rear panel 12 which is configured to be height adjustable, and the height position of the second seal member 32 can be adjusted continuously by varying the height of the support bracket 33. Therefore, the height of the second seal member 32 can be adjusted in the side portion of the opening 3 to remove a step between the second seal member 32 and the roof 2.

As described above with reference to FIG. 5, the support bracket 33 is disposed to receive the flange portion 4 of the roof 2, whereby the support bracket 33 can be disposed so as not to interfere with the flange portion 4 or the slider 40. Also, even when the flange portion 4 has a large height, increase of the overall thickness of the sunroof unit 10 can be suppressed.

The description of the concrete embodiment has been provided in the foregoing, but the present invention is not limited to the foregoing embodiment and can be carried out with various modifications and alterations. For example, in the above embodiment, the elongated hole 61 was formed in the vertical wall 43 of the frame 20, but the elongated hole 61 may be formed in the outer vertical wall 56 of the support bracket 33. Also, the fastening member for mounting the support bracket 33 on the vertical wall 43 is not limited to the bolt 62 and may be a rivet, a wedge, or the like. Further, a seal member similar to the first seal member 31 may be attached to the side edge of the rear molded part 17 and the second seal main body 37 of the second seal member 32 may resiliently contact this seal member to define the passage 64 for the stay 63 jointly with the seal member. Besides, the concrete structure, arrangement, number, material, etc. of the members or parts may be changed appropriately without exceeding the spirit of the present invention. It is also to be noted that not all of the component parts shown in the foregoing embodiment are necessarily indispensable, and they may be selectively used as appropriate. For example, in the foregoing embodiment, some of the component parts, such as the guide rails 24, stays 63, second seal members 32, etc. are provided symmetrically on both left and right sides of the sunroof unit 10, but they may be provided on only one of the left and right sides.

LIST OF REFERENCE NUMERALS 1 automobile
2 roof
3 opening
4 flange portion
10 sunroof unit
11 front panel
12 rear panel
16 rear panel main body
17 rear molded part
18 rear seal portion
20 frame
21 side frame
31 first seal member
32 second seal member
33 support bracket
40 slider
41 guide wall
41A outer guide wall
41B inner guide wall
43 vertical wall
44 drainage groove
56 outer vertical wall
57 inner vertical wall
58 connecting wall
60 nut
61 elongated hole
62 bolt (fastening member)
63 stay
64 the passage
66 lateral rib
67 drainage hole
68 fastening portion
69 the protruding portion
70 vertical rib

The invention claimed is:

1. A sunroof unit for at least partially opening and closing an opening formed in a roof of a vehicle, the sunroof unit comprising:
a frame configured to be disposed below the roof so as to be aligned with the opening;
a rear panel secured to the frame to close a rear portion of the opening; and
a front panel that includes a stay depending from a side portion thereof and is supported by the frame via the stay so as to be slidable between a closed position to close a front portion of the opening and an open position where the front panel overlaps on top of the rear panel to open the front portion of the opening,
wherein the rear panel includes a rear panel main body and a rear molded part provided on an outer peripheral edge of the rear panel main body and contacts an edge of the opening via a rear seal portion,
the rear seal portion includes a first seal member mounted to the rear molded part in a rear portion of the opening and a second seal member extending in a fore and aft direction and supported by the frame via a support bracket to form a passage for the stay between the second seal member and the rear molded part in a side portion of the opening,
the frame includes a pair of guide walls disposed more inboard than a side edge of the opening and slidably guiding a slider, which supports the stay, in the fore and aft direction below the passage and a vertical wall formed to stand upright at a position more outboard than the side edge of the opening, the frame being fixed to the roof such that a flange portion depending from the side edge of the opening is received between the vertical wall and an outboard one of the guide walls, and
the support bracket has a U-shaped cross section opened upward, is disposed to receive the flange portion, supports the second seal member on an inboard side thereof, and is attached to the vertical wall on an outboard side thereof.

2. The sunroof unit according to claim 1, wherein the vertical wall is formed with an elongated hole that extends in a vertical direction, and the support bracket is fastened to the vertical wall in a height adjustable manner by a fastening member penetrating through the elongated hole.

3. The sunroof unit according to claim 2, wherein the frame has a drainage groove formed below the side edge of the opening by the vertical wall and the outboard one of the guide walls, and
a lower portion of the support bracket is disposed in the drainage groove.

4. The sunroof unit according to claim 3, wherein the support bracket includes an outer vertical wall attached to the vertical wall, an inner vertical wall supporting the second seal member, and a connecting wall that connects a lower end of the inner vertical wall and a lower end of the outer vertical wall to each other, and
a position of a lower end of the elongated hole is set such that the connecting wall is spaced upward from the frame in a state in which the support bracket is attached to the vertical wall at a lowermost position.

5. The sunroof unit according to claim 4, wherein the connecting wall includes multiple lateral ribs extending in a width direction and multiple drainage holes formed between the lateral ribs.

6. The sunroof unit according to claim 4, wherein the outer vertical wall includes two fastening portions respectively disposed at a front portion and a rear portion, a protruding portion that protrudes in an inboard direction between the two fastening portions, and multiple vertical ribs formed on the protruding portion so as to protrude in the inboard direction and to extend in the vertical direction.

7. The sunroof unit according to claim 5, wherein the outer vertical wall includes two fastening portions respectively disposed at a front portion and a rear portion, a protruding portion that protrudes in an inboard direction between the two fastening portions, and multiple vertical ribs formed on the protruding portion so as to protrude in the inboard direction and to extend in the vertical direction.

* * * * *